(12) United States Patent
Murry et al.

(10) Patent No.: US 11,598,212 B2
(45) Date of Patent: Mar. 7, 2023

(54) METHOD FOR BALANCING A SET OF BLADES

(71) Applicant: SAFRAN AIRCRAFT ENGINES, Paris (FR)

(72) Inventors: Antoine Victor Murry, Moissy-Cramayel (FR); Mourad Yahia Bacha, Moissy-Cramayel (FR); Jérôme Henri Noël Lacaille, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 454 days.

(21) Appl. No.: 16/758,576

(22) PCT Filed: Oct. 25, 2018

(86) PCT No.: PCT/FR2018/052654
§ 371 (c)(1),
(2) Date: Apr. 23, 2020

(87) PCT Pub. No.: WO2019/081860
PCT Pub. Date: May 2, 2019

(65) Prior Publication Data
US 2020/0347727 A1    Nov. 5, 2020

(30) Foreign Application Priority Data
Oct. 26, 2017 (FR) ...................................... 1760093

(51) Int. Cl.
*F01D 5/02*     (2006.01)
*G01M 1/02*     (2006.01)
(Continued)

(52) U.S. Cl.
CPC ............... *F01D 5/027* (2013.01); *G01M 1/02* (2013.01); *F05D 2260/81* (2013.01); *G01M 1/12* (2013.01); *G01M 1/14* (2013.01)

(58) Field of Classification Search
CPC ........... F01D 5/027; G01M 1/02; G01M 1/12; G01M 1/14; G01M 1/16; G01M 1/28
See application file for complete search history.

(56) References Cited

U.S. PATENT DOCUMENTS

2017/0185937 A1    6/2017    Ricordeau et al.
2018/0101825 A1    4/2018    Lacaille
2018/0253664 A1    9/2018    Rabenoro et al.

FOREIGN PATENT DOCUMENTS

JP    2007198265 A    8/2007

OTHER PUBLICATIONS

Search Report issued in French Patent Application No. 1760093 dated Jul. 4, 2018.

(Continued)

*Primary Examiner* — Richard A Edgar
*Assistant Examiner* — Behnoush Haghighian
(74) *Attorney, Agent, or Firm* — Pearne & Gordon LLP

(57) ABSTRACT

A method for balancing a set of blades intended to be arranged on a bare disc of an aircraft engine, the bare disc comprising a defined number of numbered cells ($a_i$) intended to receive the same defined number of blades, which can have a spread of mass, the method comprising the following steps:—sorting the blades by monotonic order of their mass ($m_i$) to form an ordered set of blades,—separating the ordered set of blades in a balanced manner into four lobes constituted by a first large lobe, by a second large lobe, by a first small lobe and by a second small lobe, the blades being classified into each lobe according to a current placement order, and—arranging the four lobes on the bare disc (Continued)

by making the current placement order of the blades correspond to the numbered cells of the bare disc.

13 Claims, 10 Drawing Sheets

(51) Int. Cl.
    *G01M 1/14*     (2006.01)
    *G01M 1/12*     (2006.01)

(56) References Cited

OTHER PUBLICATIONS

International Search Report issued in Application No. PCT/FR2018/052654 dated Dec. 20, 2018.
Written Opinion issued in Application No. PCT/FR2018/052654 dated Dec. 20, 2018.
Samir V. Amiouny et al: "Heuristics for Balancing Turbine Fans", Operations Research, Aug. 1, 2000, pp. 591-602, vol. 48, No. 4, XP055489688.
Yahya Fathi et al: "A mathematical model and a heuristic procedure for the turbine balancing problem", European Journal of Operational Research, Jan. 1, 1993, pp. 336-342, XP055489714.

METHOD FOR BALANCING A SET OF BLADES

This is the National Stage of PCT international application PCT/FR2018/052654, filed on Oct. 25, 2018 entitled "METHOD FOR BALANCING A SET OF BLADES", which claims the priority of French Patent Application No. 1760093 filed Oct. 26, 2017, both of which are incorporated herein by reference in their entirety.

TECHNICAL FIELD

This invention relates to the field of balancing aircraft engine bladed disks and more particularly, a method of balancing a set of blades intended to be placed on a bare disk of an aircraft engine.

STATE OF PRIOR ART

The blades of an aircraft engine may have mass variations related to the method of manufacturing them and the presence of some particular blades with masses different from the masses of other blades. Furthermore, the bare disk may possibly have a non-negligible radial out-of-balance, particular for bare disks of low pressure turbines. Thus, blades must be mounted on a bare disk of an aircraft engine so as to minimise the out-of-balance.

There are algorithms for the placement of blades on hydraulic turbines. These algorithms produce good results but require a considerable calculation time and cannot be adapted for aircraft engines.

There are non-polynomial type "NP-hard" heuristic balancing algorithms in the aeronautical field that can increase the speed of the balancing problem. One such example is described in the document entitled "Heuristics for Balancing Turbine Fans" by Samir Amiouny 1997. However, the algorithms listed cannot take account of pressures on disks due to centrifugal forces and disparities between adjacent blades that can cause disk deformations and the initiation of cracks in slots in which the blades will fit, causing premature wear of the disks. Furthermore, they do not take account of out-of-balances in the bare disks nor constraints related to the presence of some particular blades.

The purpose of this invention is to propose a method of balancing bladed disks of an aircraft engine that overcomes the above-mentioned disadvantages, minimising the calculation time and taking account of constraints related to centrifugal forces and out-of-balances of bare disks.

PRESENTATION OF THE INVENTION

This invention is defined by a method for balancing a set of blades that will be arranged on a bare disk of an aircraft engine, the bare disk comprising a determined number of numbered slots that will hold the same determined number of blades that can have a dispersion of mass, said method comprising the following steps:
  sort the blades by monotonic order of their mass, forming an ordered set of blades,
  separate the ordered set of blades in a balanced manner into four lobes composed of a first large lobe, a second large lobe, a first small lobe and a second small lobe, the blades being sorted in each lobe in a current placement order, and
  arrange the four lobes on the bare disk such that the current placement order of the blades corresponds to the numbered slots of the bare disk.

Thus, this method enables automation of the balancing of bladed disks while minimising the number of steps and optimising the calculation time. Furthermore, this method can distribute the blades according to a geometric configuration that limits deformations of the disk and consequently increases its life. The distribution of masses of the blades in four lobes can reduce the pressure related to the centrifugal force.

Advantageously, separation of the set of blades into four lobes comprises the following steps:
  separate the ordered set of blades into first and second groups approximately balanced in mass in a balanced manner, assigning distinctive blades included in the ordered set of blades to the first and second groups according to a predetermined process, and sharing the other blades in decreasing order of their mass alternating between the first and second groups while taking account of the number of distinctive blades assigned to each of the first and second groups, and
  compose the first and second large lobes in a balanced manner starting from said first group and compose the first and second small lobes in a balanced manner starting from said second group.

This makes it possible to distribute the blades in a manner that does not trigger initiation of cracks in the slots. Furthermore, the creation of two initially balanced groups can minimise the number of iterations of the balancing algorithm in the case in which the out-of-balance on the bare disk is small (this is the case for the majority of cases).

According to one embodiment of this invention, the distinctive blades are blades with hardened lips that are distributed between the first and second groups depending on their number while optimising intervals between them, according to the following steps:
  if the set of blades comprises three blades with hardened lips, the two heaviest are placed in the first group while the lightest is placed in the second group, and
  if the set of blades comprises one or two blades with hardened lips, it is (they are) placed in the first group.

This enables blades with lips to optimally excavate the abradable material placed on the case facing the blades and consequently optimise air compression in the engine.

Advantageously, the composition of the first and second large or small lobes within the first or second groups respectively is determined by distributing the blades on the first, second, third and fourth half-lobes of the first or the second group as a function of parity and/or divisibility properties of the number of blades forming the first group or the second group.

This enables an optimum distribution of the masses of the blades.

According to a first embodiment of this invention, if the number of blades in the first or second group is an even number that is not divisible by four, the first and second blades are then placed at the vertices of the first and second large or small lobes and the remaining blades are distributed in a predetermined manner on the first, second, third and fourth half-lobes of the first or second group.

According to a second embodiment of this invention, if the number of blades in the first or second group is a number that is divisible by four, the blades are distributed equitably in a predetermined manner on the first, second, third and fourth half-lobes of the first or second group.

According to a third embodiment of this invention, if the number of blades in the first or second group is an odd number, the last blade is positioned between the two large or small lobes and if the number of remaining blades is divisible by four, they are distributed in a predetermined manner on the first, second, third and fourth half-lobes of the first or second group.

According to a fourth embodiment of this invention, if the number of blades in the first or second group is an odd number, the last blade is positioned between the two large or small lobes and if the number of remaining blades is not divisible by four, the first and second blades are placed at the vertices of the first and second large or small lobes and the remaining blades are distributed in a predetermined manner on the first, second, third and fourth half-lobes of the first or second group.

Advantageously, the distribution in a predetermined manner of a number of blades divisible by four on the first, second, third and fourth half-lobes of the first or second group is made according to periodic sequences of eight steps as follows:
  place the first current blade in the first unoccupied position in the second half-lobe,
  place the second current blade in the first unoccupied position in the first half-lobe,
  place the third current blade in the first unoccupied position in the fourth half-lobe,
  place the fourth current blade in the first unoccupied position in the third half-lobe.
  place the next four blades on the half-lobes in the reverse order of the order in the previous steps.

According to one embodiment of this invention, the method includes the following steps:
  arrange the four lobes on the bare disk in a configuration determined as a function of a first out-of-balance vector representative of an out-of-balance inherent to the bare disk, and
  reorganiser the blades in the different lobes using an iterative permutation process adapted to balance the first out-of-balance vector by a second out-of-balance vector resulting from the mass dispersion of the blades and their arrangements on the disk, said reorganisation defining a final placement order of the blades on the disk slots.

This can result in a radial out-of-balance close to zero on the disk-blades assembly taking account of the out-of-balance of the bare disk.

Advantageously, the determined configuration comprises the arrangement of the first and second small lobes on the bare disk on each side of the first out-of-balance vector.

This provides a means of optimally balancing the first and second out-of-balances.

Advantageously, said iterative permutation process comprises the following steps:
  iterative random permutations of blades between the first group and the second group, reapplying the blade placement steps after each iteration,
  if, after the permutations in the previous step, the resulting out-of-balance is greater than a predetermined threshold, stochastic permutations of blades are made between the first group and the second group while reapplying placement steps of the blades after each iteration, and
  if, after the permutations in the previous step, the resulting out-of-balance is greater than said predetermined threshold, stochastic permutations are made directly on the shape between the first group and the second group.

This enables total balancing of the out-of-balance less than the predetermined threshold. This balancing is advantageously done respecting the monotonic shape of blade masses and possibly deforming it slightly if the first and second permutation steps were insufficient to respect the balancing criterion.

Advantageously, the iterations are continued in each permutation step as long as the out-of-balance mass is larger than the predetermined threshold and the number of iterations is smaller than a maximum predetermined threshold.

This invention also relates to a system for balancing a set of blades that will be arranged on a bare disk of an aircraft engine, the bare disk comprising a determined number of numbered slots that will hold the same determined number of blades that can have a dispersion of mass, said system comprising a processor configured to:
  sort the blades by monotonic order of their mass, forming an ordered set of blades,
  separate the ordered set of blades in a balanced manner into four lobes composed of a first large lobe, a second large lobe, a first small lobe and a second small lobe, the blades being sorted in each lobe in a current placement order, and
  arrange the four lobes on the bare disk such that the current placement order of the blades corresponds to the numbered slots of the bare disk.

DETAILED PRESENTATION OF PARTICULAR EMBODIMENTS

The concept of the invention consists of establishing a correspondence between blades that will be installed on a bare disk of an engine in a balanced manner while increasing the life of the disk and minimising its deformation, knowing that there may be a dispersion of the mass of the blades.

This invention is applicable to the installation of blades on a bare disk of any type of engine, for example aircraft engines and particularly on disks of low pressure turbines of an aircraft.

Figure 1:
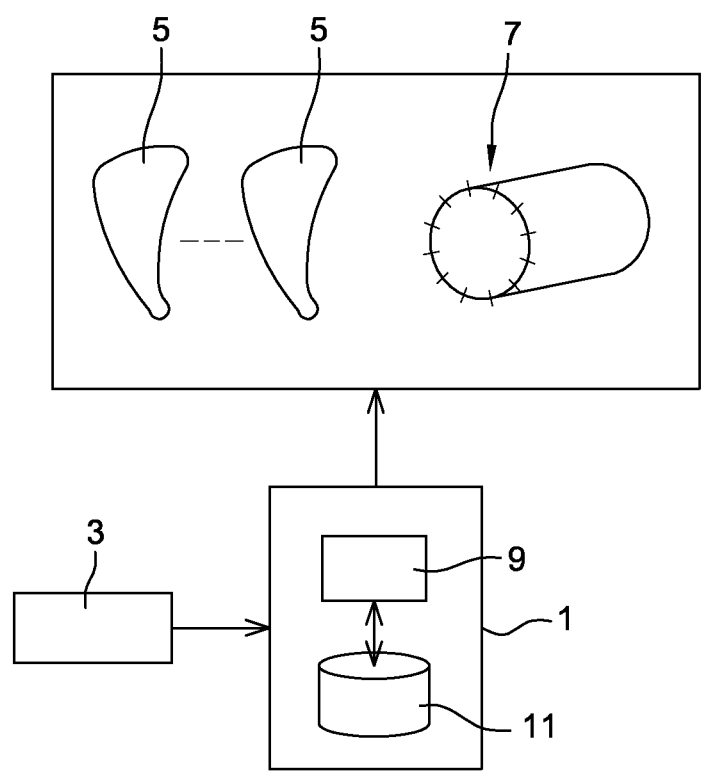
FIG. 1 diagrammatically illustrates hardware means used in the balancing method according to the invention.

FIG. 1 diagrammatically illustrates the hardware means used in the balancing method according to the invention.

The hardware means comprise a computer 1 and measurement instruments 3 and in particular instruments to evaluate the masses $m_i$ of blades 5 intended to be installed on a bare disk 7 of an aircraft engine.

The computer is usually provided with a processor 9 used to execute one or more computer programs comprising program code instructions, stored in storage units 11 of the computer 1 and designed and configured to use the balancing method according to the invention.

Figure 2:
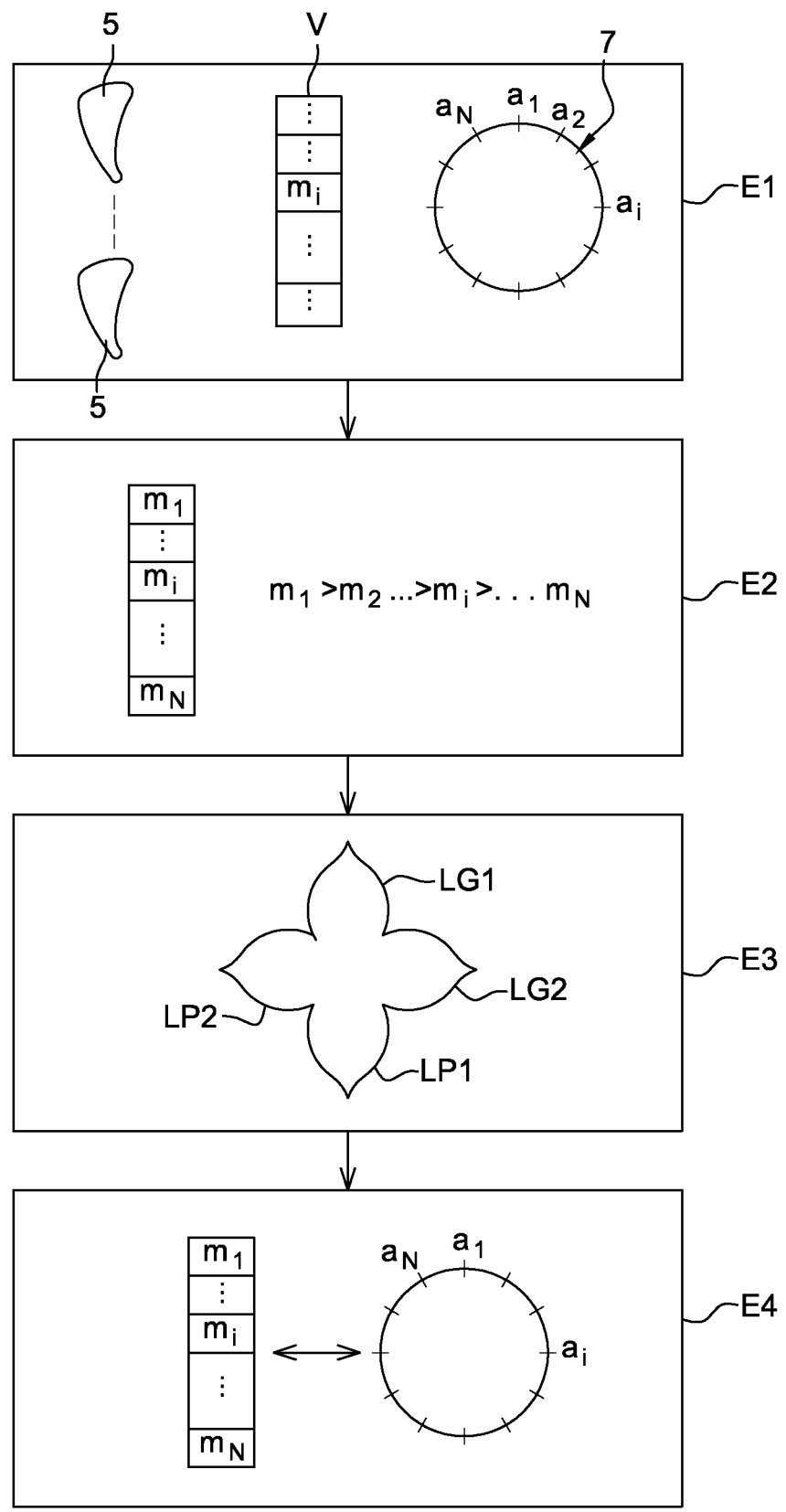
FIG. 2 is a flow chart illustrating a method of balancing a set of blades that will be arranged on a bare disk of an aircraft engine, according to one embodiment of the invention.

FIG. 2 is a flow chart illustrating a method of balancing a set of blades that will be arranged on a bare disk of an aircraft engine, according to one embodiment of the invention.

Step E1 relates to the initialisation of data comprising the mass $m_i$ of each blade 5 and the number of slots $a_i$ on the bare disk 7 intended to hold blades 5. More particularly, the slots $a_i$ are numbered in order from 1 to N (i.e. $a_1, \ldots a_N$) in a defined direction (for example in the clockwise direction) and are all spaced at the same intervals on the disk 7. Thus, knowing the total number N of slots $a_i$ on the disk 7, their angular positions $\alpha_i$ can be deduced. The masses $m_i$ of blades 5 are defined by a mass vector V with dimension N, in which each element $m_i$ must correspond to one and only one slot $a_i$. The purpose of the balancing method is to set up a bijective correspondence between the elements $m_i$ of the mass vector V and the slots $a_i$ of the disk 7. This correspondence enables easy installation of the blades 5, the positioning of which on the bare disk 7 takes account of their mass dispersion to satisfy an out-of-balance criterion and any other constraints.

In step E2, the processor 9 is configured to sort the blades 5 in monotonic order (for example decreasing) of their mass thus forming an ordered set of blades 5. The initial mass vector V can thus be rearranged to form a current mass vector V in decreasing order of blades 5.

In step E3, the processor 9 is configured to separate the ordered set of blades 5 into four groups called lobes LG1, LG2, LP1, LP2, in a balanced manner. The blades 5 are sorted in each lobe in a particular placement order representing a current placement order that can be used to update the current mass vector V. Two of the four lobes are categorised in a first class called "Large lobes" LG1 and LG2, and the other two lobes are categorised in a second class called "Small lobes" LP1 and LP2.

Figure 3:
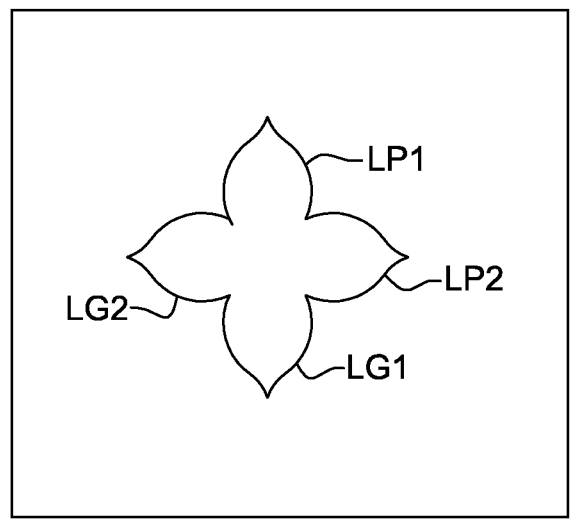
FIG. 3 diagrammatically illustrates placement of blades in four lobes, according to one embodiment of the invention.
Figure 4A:
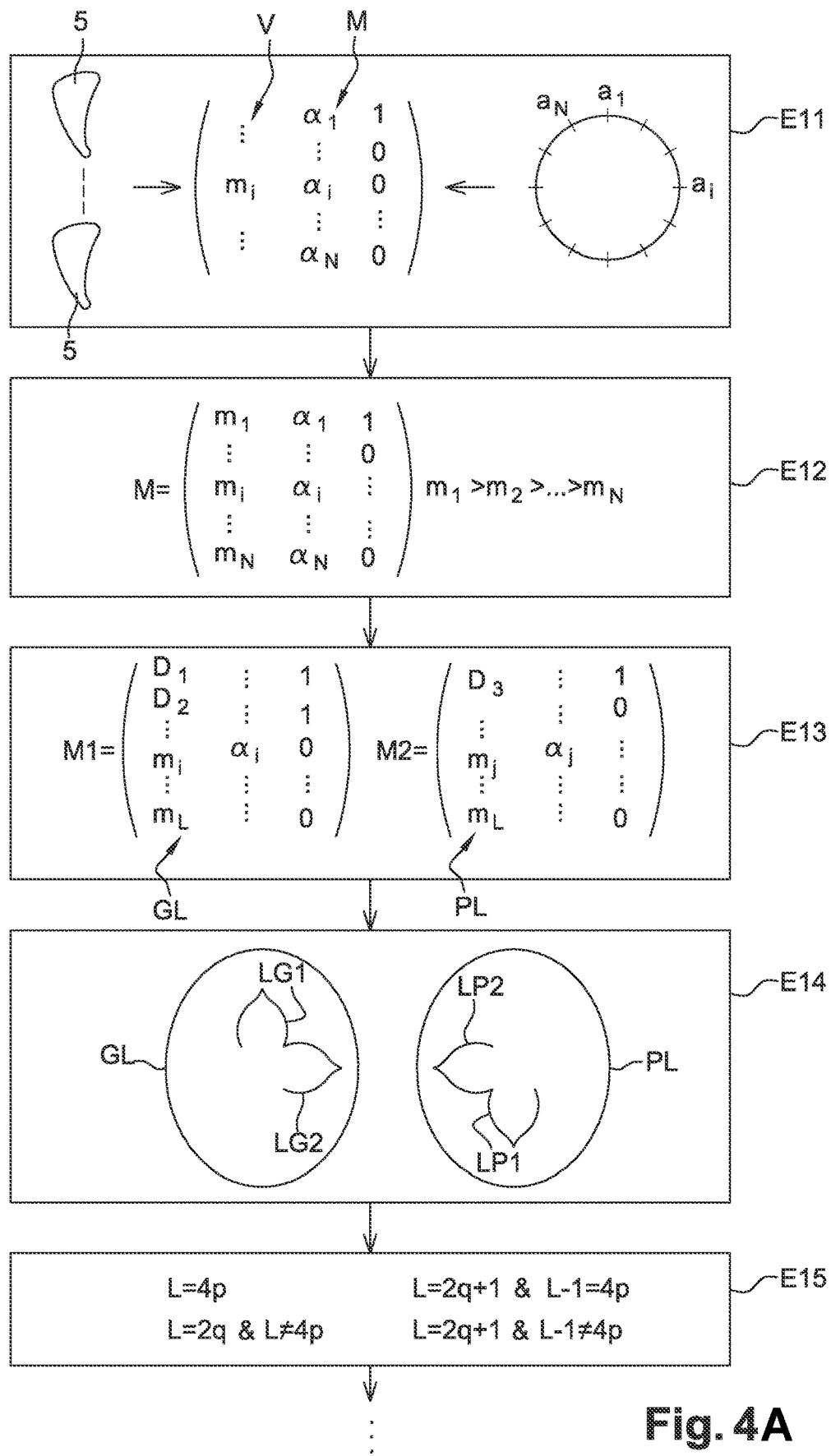
FIGS. 4A-4D illustrate a method of balancing blades on a bare disk of an aircraft engine, according to one preferred embodiment of the invention.
Figure 4B:
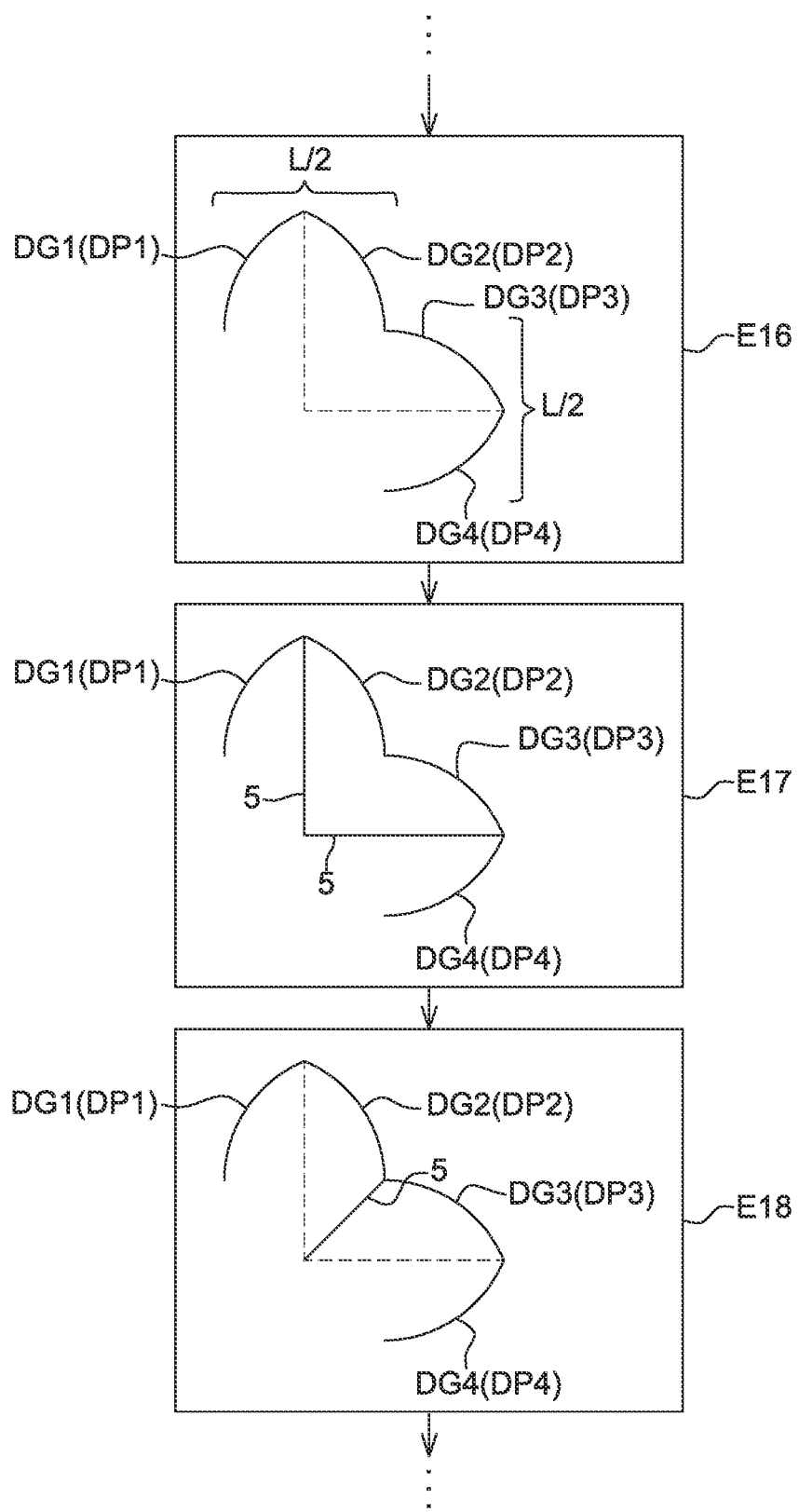
Figure 4C:
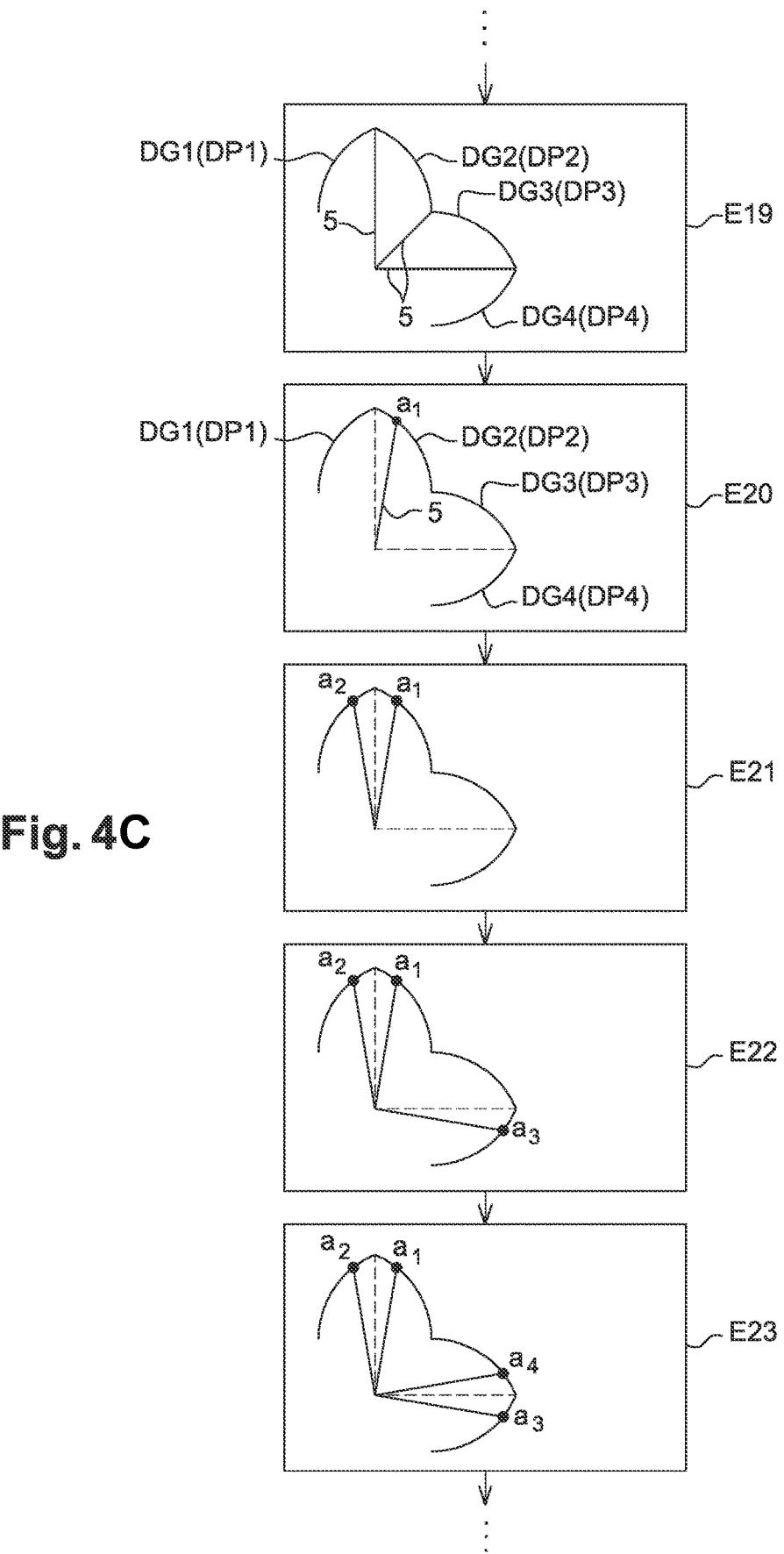
Figure 4D:
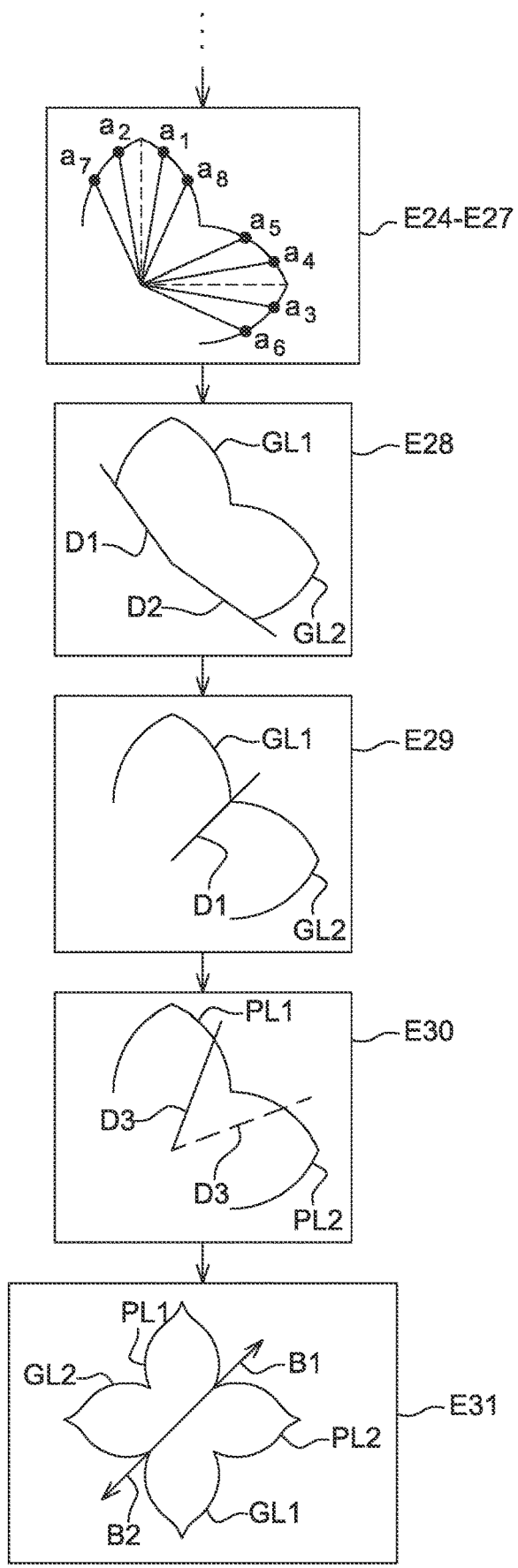

FIG. 3 diagrammatically illustrates the placement of blades in four lobes, according to one embodiment of the invention.

The blades 5 are represented by radial segments, the lengths of which are representative of their masses. Thus, the different lengths characterise the mass dispersion of the blades. More particularly, the four lobes are composed of a first large lobe LG1, a second large lobe LG2, a first small lobe LP1 and a second small lobe LP2. This configuration represents the optimum shape to reduce the pressure related to the centrifugal force while remaining easy to implement. A balanced configuration will be observed but that will tend to deform the disk because it is not lobe-shaped. Furthermore, when there are only two lobes, the disk will tend to become oval as it is used, due to the pressure force. A number of lobes larger than four is complex to produce in practice and does not provide a significant gain in reducing the pressure.

In step E4, the processor 9 is configured to arrange the four lobes LG1, LG2, LP1, LP2 on the bare disk 7 making the current placement order of the blades 5 as defined in the current mass vector V correspond to the numbered slots $a_i$ of the bare disk 7.

Furthermore, if the bare disk 7 has an initial out-of-balance, the blades 5 in the different lobes can be reorganised according to an iterative permutation process to compensate for the out-of-balance of the disk 7 according to one embodiment of the invention described below with reference to FIG. 5.

Advantageously, at the end of the process, the elements in the mass vector are put into the same order as the order in which the slots are numbered, thus simplifying their installation.

FIGS. 4A-4D illustrates a method of balancing blades on a bare disk of an aircraft engine, according to one preferred embodiment of the invention.

In step E11, data about the blades 5 and the bare disk 7 are initialised. These data comprise the mass $m_i$ of each blade 5 and its specificity, in other words whether or not it is particular (for example of the type with hardened lip). The initialisation data also comprise the number N of numbered slots $a_i$ of the bare disk 7, the radius R of the bare disk 7, the out-of-balance 7 of the bare disk in cm·g, and the angle of the out-of-balance of the bare disk 7 in degrees.

Advantageously, data concerning the blades 5 can be organised according to a blades matrix M composed of three columns. For a given line associated with a given blade 5, the first column contains the mass $m_i$ of the blade 5, the second column contains the angle $\alpha_i$ of the slot $a_i$ that will hold said blade and the third column indicates whether or not the blade 5 is particular (for example the number "1" represents a particular blade and the number "0" represents a standard blade). It will be noted that the first column represents the mass vector V of the blades 5.

In the following, a blade with hardened lip will be considered as an example of a particular blade. It will be remembered that a blade with hardened lip is suitable for creating grooves in the abradable material placed on the case facing the blades so as to optimise air compression in the engine.

In step E12, the processor 9 is configured to sort the blades 5 in decreasing order of their mass $m_i$ forming an ordered set of blades listed in the first column of the blades matrix M.

In steps E13-E30, the processor 9 is configured to sort the blades into four lobes: a first large lobe LG1, a second large lobe LG2, a first small lobe LP1 and a second small lobe LP2.

More particularly, in step E13, the processor 9 is configured to separate the ordered set of blades 5 in a balanced manner into first and second groups GL and PL substantially balanced in mass listed in the first and second matrices M1 and M2 respectively. The first and second groups GL and PL correspond to a group of large lobes and a group of small lobes respectively.

Firstly, the distinctive blades $D_i$ (i.e. Blades with hardened lips) included in the ordered set of blades 5 are assigned to the first and second groups GL and PL according to their number.

In particular, if the set of blades comprises three blades with hardened lips $D_1$-$D_3$, the two heaviest $D_1$ and $D_2$ are placed in the first group GL while the lightest $D_1$ is placed in the second group PL.

On the other hand, if the set of blades comprises one to two blades with hardened lips $D_i$, it is (they are) placed in the first group GL.

It will be noted that particular blades $D_i$ are placed according to a predetermined process intended to optimise the spacing between these blades as explained below in steps E28-E30.

Furthermore, once the blades with hardened lips $D_i$ are placed in the two groups GL and PL, the remaining blades 5 need to be distributed. The other blades are shared in decreasing order of their mass alternately between the first and second groups GL and PL. These remaining blades 5 are put into place taking account of the number of distinctive blades $D_i$ attributed to each of the first and second groups GL and PL such that these groups are the same size. The first and second groups GL and PL are firstly rebalanced by placing the number of necessary blades in the second group PL. Thus, if the set of blades 5 comprises one blade or three blades with hardened lips, $D_i$, then a standard blade 5 is placed in the second group PL. Furthermore, if the set of blades 5 comprises two blades with hardened lips, $D_i$, then two standard blades 5 are placed in the second group PL. The placement is then made by sorting the blades 5 by decreasing mass beginning with the first group GL. The first blade is placed in the first group GL, the second is placed in the second group PL and so on. It will be noted that the blades 5 are ordered according to their mass in decreasing order in each of the first and second groups GL, PL.

In step E14, the processor 9 is configured to compose the first and second large lobes GL1, GL2 in a balanced manner starting from the first group GL and to compose the first and second small lobes PL1, PL2 in a balanced manner starting from the second group PL. Blades 5 are sorted in each of the four lobes GL1, GL2, PL1, PL2 in a determined order.

The composition of the first and second large lobes GL1, GL2 or small lobes PL1, PL2 within the first group GL or the second group PL respectively is determined by distributing the blades 5 on the first, second, third and fourth half-lobes DG1-DG4 or DP1-DP4 of the first group GL or the second group PL as a function of parity and/or divisibility properties of the number of blades 5 forming the first group GL or the second group PL.

In step E15 the processor 9 is configured to determine the parity and the divisibility of the number of blades in a group GL or PL, according to four predetermined cases. The following four possibilities are envisaged for creation of the two lobes within each of the two groups starting from a number L of blades: L is divisible by four, L is even and not divisible by four, L is odd and L−1 is divisible by four, and finally L is odd and L−1 is not divisible by four. Each of these four possibilities is associated with a corresponding blade placement step among steps E16-E19.

Step E16 relates to the case in which the number L of blades in the first group GL or the second group PL is a number divisible by four. In this case, the blades 5 are equitably distributed in a predetermined manner on the first, second, third and fourth half-lobes DG1-DG4 or DP1-DP4 of the first group GL or the second group PL. A quarter of the blades (L/4) are placed on each of the four half-lobes, in steps E20-E27.

Step E17 relates to the case in which the number L of blades in the first group GL or the second group PL is a number that is not divisible by four. In this case, the first and second blades are placed at the vertices of the first and second (large or small) lobes (GL1 and GL2; or PL and PL2). The remaining blades (that now have a number that is divisible by four) are distributed in a predetermined manner on the first, second, third and fourth half-lobes DG1-DG4 or DP1-DP4 of the first group GL or the second group PL. Thus, since the blades were previously sorted by decreasing mass, the first blade (i.e. the heaviest blade) in the corresponding blades matrix M1 or M2 is placed at the vertex of the first lobe GL1 or PL1 and the second blade in the corresponding blades matrix is placed at the vertex of the second lobe GL1 or PL1. These two blades are then removed from the corresponding blades matrix before going onto steps E20-E27.

Step E18 relates to the case in which the number L of blades in the first group GL or the second group PL is an odd number and in which the number of blades is decremented by one unit (i.e. L−1) is divisible by four. In this case, the last blade (i.e. the lightest weight blade) is positioned between the two (large or small) lobes and the remaining blades (the number of which is divisible by four) are distributed in a predetermined manner on the first, second, third and fourth half-lobes of the first or the second group. The lightest weight blade that was positioned between the two lobes is then eliminated from the blades matrix before going onto steps E20-E27 to place a quarter of the remaining blades ((L−1)/4) on each half-lobe.

Step E19 relates to the case in which the number of blades in the first or the second group is an odd number and in which the number of blades decremented by one unit (i.e. L−1) is not divisible by four. In this case, the last blade (i.e. the lightest weight blade) is positioned between the two (large or small) lobes (GL1 and GL2; or PL1 and PL2) and the first and second blades are placed at the vertices of the first and second (large or small) lobes (GL1 and GL2; or PL1 and PL2). The remaining blades (that have a number that is divisible by four) are distributed in a predetermined manner on the first, second, third and fourth half-lobes of the first or the second group PL. The figure corresponding to this step clearly shows that the lightest weight blade in the group is positioned between the two lobes (GL1 and GL2; or PL and PL2) and the first blade in the corresponding blades matrix (i.e. the heaviest blade) is placed at the vertex of the first lobe (GL1 or PL1) and the second blade in the matrix is placed at the vertex of the second lobe (GL2 or PL2). These three blades are then eliminated from the blades matrix before going onto steps E20-E27 to place a quarter of the remaining blades on each half-lobe.

The remaining blades (composed of a number K that is divisible by four) are placed making use of a predetermined distribution protocol according to periodic sequences of eight steps E20-E27. It will be noted that the half-lobes represented on the figures associated with steps E20-E27 refer to the four large half-lobes DG1-DG4 or to the four small half-lobes DP1-DP2.

In step E20, the processor 9 is configured to place the first current blade a (i.e. the heaviest blade among the remaining blades) in the first unoccupied position of the second half-lobe DG2 or DP2.

In step E21, the processor 9 is configured to place the second current blade $a_2$ in the first unoccupied position of the first half-lobe DG1 or DP1.

In step E22, the processor 9 is configured to place the third current blade $a_3$ in the first unoccupied position of the fourth half-lobe DG4 or DP4.

In step E23, the processor 9 is configured to place the fourth current blade $a_4$ in the first unoccupied position of the third half-lobe DG3 or DP3.

In steps E24-E27, the processor 9 is configured to place the next four blades $a_5$-$a_8$ on the half-lobes in the reverse order of the previous steps E20-E23. In other words, in step E24, the fifth current blade as is placed in the first unoccupied position of the third half-lobe DG3 or DP3. In step E25, the sixth current blade $a_6$ is placed in the first unoccupied position of the fourth half-lobe DG4 or DP4. In step E26, the seventh current blade $a_7$ is placed in the first unoccupied position of the first half-lobe DG1 or DP1. In step E27, the eighth current blade as is placed in the first unoccupied position of the second half-lobe DG2 or DP2.

Figure 5:
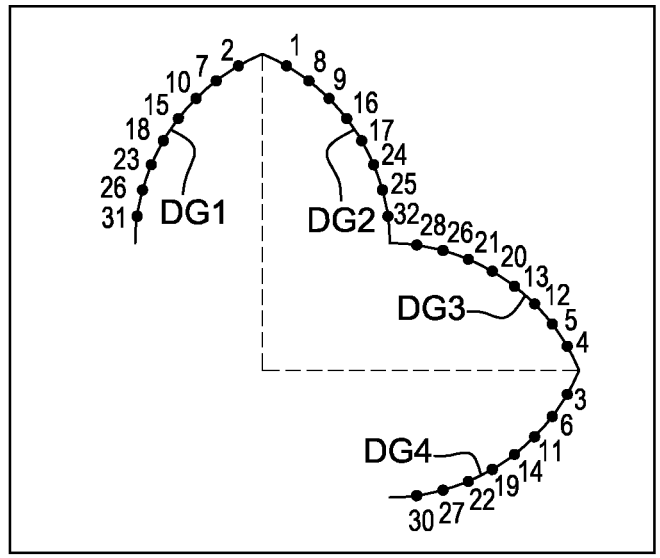
FIG. 5 is an example diagrammatically illustrating the placement of blades, according to one embodiment of the invention.

FIG. 5 is an example diagrammatically illustrating the placement of blades according to steps E20-E27. In this example, the number K of remaining blades is equal to "32" and they are sorted from "1" to "32" from the heaviest mass to the lightest weight mass.

An attempt is made to place eight blades on each of the four large half-lobes DG1-DG4. Thus, the heaviest blade represented by the number "1" is place in the first position of the second half-lobe DG2. The second blade is placed in the first position of the first half-lobe DG1. Blades "3" and "4" follow the same pattern on the second lobe DG4 and DG3. The procedure is reversed to optimise the balance of the two lobes.

Thus initially, the two heaviest blades (blades "1" and "2") were positioned on the first lobe LG1 and the next two blades (blades "3" and "4") on the second lobe LG2. Then, the two heaviest blades (blades "5" and "6") are positioned on the second lobe LG2 and the two lightest weight blades (blades "7" and "8") on the first lobe LG1. These operations are reiterated until the last blade "32" to be placed is reached.

From an algorithmic point of view, four vectors are generated containing the following series of numbers of four half-lobes:

First half-lobe DG1: (31, 26, 23, 18, 15, 10, 7, 2).
Second half-lobe DG2: (1, 8, 9, 16, 17, 24, 25, 32).
Third half-lobe DG3: (29, 28, 21, 20, 13, 12, 5, 4).
Fourth half-lobe DG4: (3, 6, 11, 14, 19, 22, 27, 30).

Once the four half-lobes DG1-DG4 have been created, the blades with hardened lips are placed in steps E28-E30 using a configuration with the largest possible spacing.

Steps E28-E30 correspond to a predetermined process for placement of blades with hardened lips.

More particularly, step E28 relates to the case in which three blades with hardened lips $D_1$-$D_3$ are present in the initial set. As indicated above, the two heaviest blades $D_1$ and $D_2$ are placed in the first group GL (i.e. first and second large lobes GL1 and GL2) while the lightest weight blade $D_3$ is placed in the second group PL (i.e. first or second small lobe (PL1 and PL2). The heaviest two lobes $D_1$ and $D_2$ placed in the first and second large lobes GL1 and GL2 are placed with the largest possible spacing (ideally with an angular separation of about 120°) by permuting them with other blades with the same masses located on the external half-lobes (i.e. first half-lobe DG1 and fourth half-lobe DG4).

Step E29 relates to the case in which a single blade with hardened lip $D_1$ is located in the first group GL (i.e. first and second large lobes GL1 and GL2). In this case, the particular blade $D_1$ is placed as close as possible to the middle of the two large lobes GL1 and GL2.

Finally, step E30 relates to the case in which there is one blade with hardened lip $D_3$ in the second group (i.e. first or second small lobe PL1 and PL2). This is placed as close as possible to the middle of the two small lobes PL and PL2 according to two possible configurations. In a first case, the blade with hardened lip $D_3$ (in dashed line) is placed between the vertex and the end of the first small lobe PL1. In a second case, the blade with hardened lip $D_3$ (in dashed line) is placed between the beginning and the vertex of the second small lobe PL2. The selected configuration is the one that optimises the spacing between all the blades with hardened lips present on the disk.

In order to position each blade with hardened lip as described above, this blade is interchanged with the blade with the closest mass in the searched zone (i.e. in the half-lobe in which it is required to place the blade with hardened lip).

Once the first and the second matrices M1 and M2 (associated with the first and second groups GL and PL) have been put into the order in which the blades forming the four lobes GL1, GL2, PL1 and PL2 were deposited, the next step is to reform the total blades matrix M in the order in which they are deposited in the disk slots (i.e. the first blade appearing on the first line of the blades matrix M will be placed in the first slot $a_1$ and so on).

Thus, in step E31, the four lobes PL1, PL2, GL1 and GL2 are arranged on the bare disk arranging them in a configuration determined as a function of the first out-of-balance vector B1 representative of the out-of-balance of the bare disk. Advantageously, the determined configuration comprises the arrangement of the first and second small lobes PL1 and PL2 on the bare disk on each side of the first out-of-balance vector B1.

It will be noted that the position of the out-of-balance of the bare disk on the slots depends on the angle of the out-of-balance of the bare disk and on the angles of the disk slots. The slots are positioned in a regular sequence of 360° by the number of slots starting from position "1" corresponding to the 0° angle. The position corresponding to the out-of-balance angle of the bare disk is thus obtained in the slots correspondence matrix.

This can be used to obtain the required blade mass vector comprising the position of the blades around the disk such that the out-of-balance of the bare disk is placed between the two small nodes. The size of the four lobes depends on the number of blades in the set initially provided.

By construction of the blade placement algorithm, it can be observed that the shape obtained can satisfy optimisation constraints. The result obtained is a shape with four lobes, continuity of the mass of adjacent blades and optimisation of the spacing between blades with hardened lips.

Furthermore, considering that the first and second small lobes PL1, PL2 and the first and second large lobes GL1, GL2 were initially created balanced, the out-of-balance generated by the blades is close to zero. However, the out-of-balance of the "blades+disk" assembly is not necessarily close to zero due to the fact that the bare disk has a certain initial out-of-balance. Thus, in order to balance the total out-of-balance, the blades are reorganised according to an iterative blade permutation process.

Figure 6:
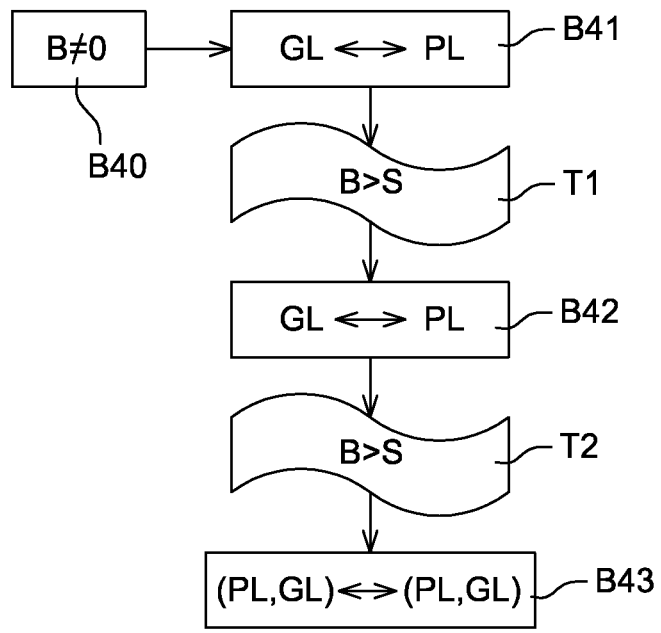
FIG. 6 is a block diagram illustrating the permutation process for balancing the total out-of-balance, according to one embodiment of the invention.

FIG. 6 is a block diagram illustrating the permutation process for balancing the total out-of-balance, according to one embodiment of the invention.

In block B40, the starting point is blades with an out-of-balance close to zero and a non-zero resulting out-of-balance B.

In block B41, the blades are reorganised by the processor 9 in the different lobes using an iterative permutation process adapted to balance the first out-of-balance vector B1 by a second out-of-balance vector B2 (see figure for step E31) resulting from the mass dispersion of the blades and their arrangements on the disk respecting the monotony of blade masses. It will be noted that in each iteration, the resulting (i.e. total) out-of-balance is calculated and the iterative process continues as long as the remaining out-of-balance is not less than a predetermined threshold S (for example about 5 cm·g) and a first maximum number of iterations has not been reached. For example, the predetermined out-off-balance threshold can be between about 1 cm·g and 5 cm·g.

A test T1 is executed after the permutations made in the bloc B41 to verify if the resultant out-of-balance B is greater than the predetermined threshold S. If it is, block B42 is executed, otherwise the process stops.

In block B42, the processor 9 performs stochastic permutations of blades between the first group GL and the second group PL, respecting the monotony of blade masses. In the same was as for block B41, the resulting out-of-balance is calculated in each iteration and the iterative process continues as long as the resultant out-of-balance is not less than the predetermined threshold and a second maximum number of iterations has not been reached.

A test T2 is executed after the permutations made in block B42 to verify if the resultant out-of-balance B is still greater than the predetermined threshold S. If it is, block B43 is executed, otherwise the process stops.

In block B43, the processor performs stochastic permutations "directly on the shape" between the first group and the second group, without necessarily respecting the monotony of blade masses. "Directly on the shape" refers to the fact that the blades are permuted without reapplying the blade placement algorithm. This implies that the total out-of-balance balancing algorithm is capable of deforming the shape and therefore potentially the blade mass monotony constraint is no longer respected. Having said this, this constraint will be taken into account in the function to be optimised using the stochastic optimisation algorithm.

It will be noted that the reorganisation of blades at the end of the iteration process for any one of blocks B41-B43 defines a final placement order of the blades on the disk slots.

Figure 7:
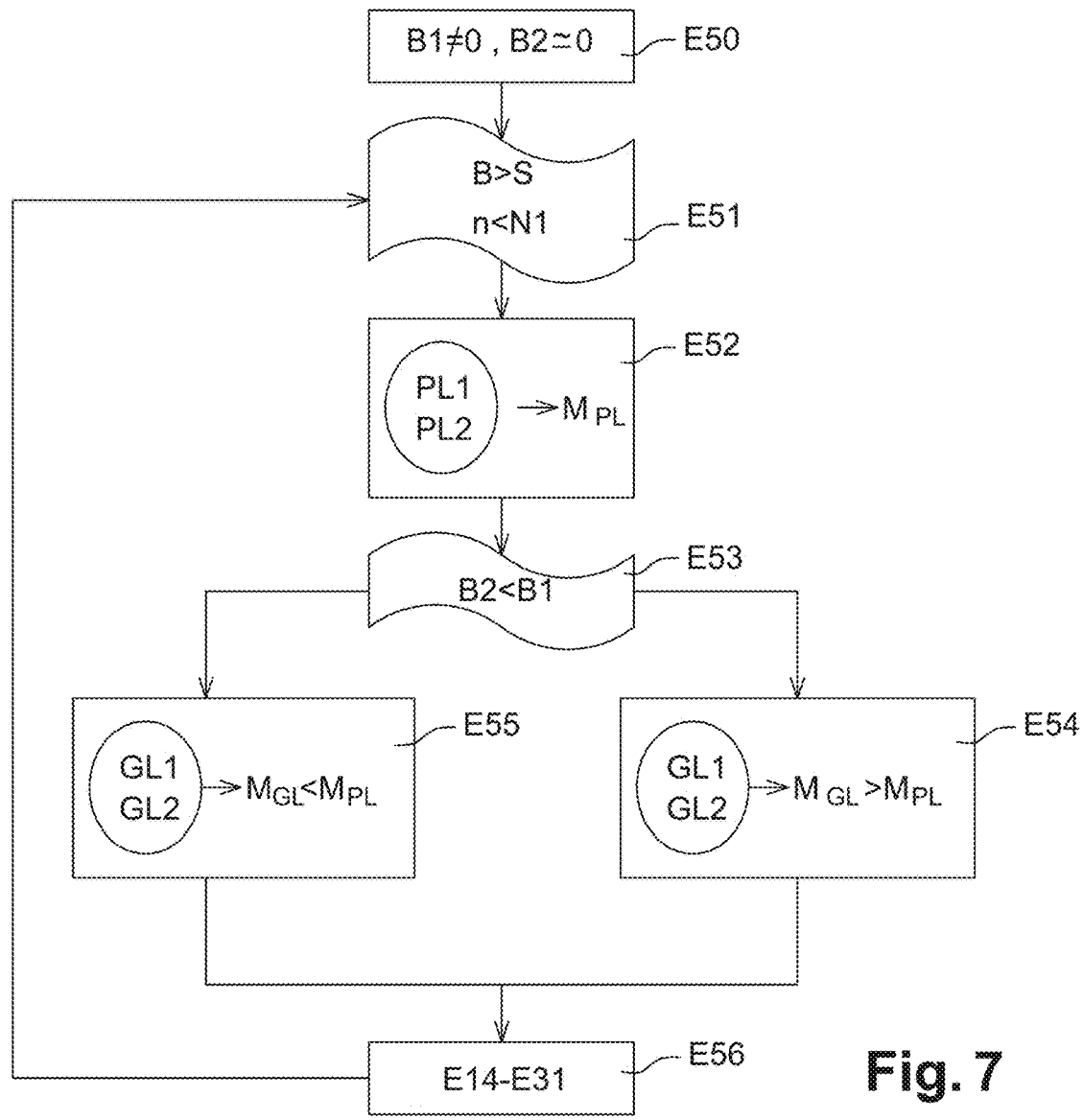
FIG. 7 is a flowchart illustrating the iterative permutation process of a block in FIG. 6, according to one embodiment of the invention, in more detail.

FIG. 7 is a flowchart illustrating the iterative permutation process of block B41 according to one embodiment of the invention, in more detail.

In the initial step E50, the out-of-balance of the blades is practically zero because the blades are created in a balanced manner. Moreover, considering that the out-of-balance of the bare disk B1 was positioned between the two small lobes PL and PL2 (see step E31 in FIG. 4D), this means that if the out-of-balance B2 on the blades is to compensate for the out-of-balance of the disk, the large lobes GL1, GL2 must be "larger" then the small lobes PL1, PL2.

The next step E51 is a test that allows passage to the next step provided that the resultant "out-of-balance" B of the "disk+blades" is more than the fixed criterion (i.e. than the predetermined threshold) and the number of iterations n is less than a maximum predetermined number N1.

The resultant out-of-balance is determined by calculating the total out-of-balance on the "disk+blades" assembly. Thus, starting from the ordered blades matrix M, the blades out-of-balance (modulus and angle) and the resultant out-of-balance are calculated as follows:

$$\text{Angle} = a\tan\left(\sum_{blades} [mass_{blade}\sin(angle_{blade}\frac{\pi}{180})]\right),$$

$$\sum_{aubes} [mass_{blade}\cos(angle_{blade}\frac{\pi}{180})]\right) * \frac{180}{\pi}$$

$$\text{Module} = Disk_{Radius}\sqrt{\left\{\sum_{blades}[mass_{blade}\sin(angle_{blade}\frac{\pi}{180})]\right\}^2 + \left\{\sum_{blades}[mass_{blade}\cos(angle_{blade}\frac{\pi}{180})]\right\}^2}$$

$$\text{Out-of-}balance_{resultant} = \sqrt{\begin{cases}\text{out-of-}balance_{disk}\cos(\frac{\pi}{180}angle_{disk}) + \\ \text{Module }\cos(\frac{\pi}{180}\text{Angle})\end{cases}^2 + \begin{cases}\text{out-of-}balance_{disk}\sin(\frac{\pi}{180}angle_{disk}) + \\ \text{Module }\sin(\frac{\pi}{180}\text{Angle})\end{cases}^2}$$

Moreover, the maximal predetermined number of iterations (or permutations) is fixed for example at N1=3000. This number was selected from a large number of disk balancing tests. The method stops if the resultant out-of-balance is less than the fixed criterion or if the maximum predetermined number is reached.

The next steps consist of making random balancing, in other words randomly permuting blades between firstly the group of the first and second large lobes GL1, GL2 and secondly the group of the first and second small lobes PL1, PL2. As specified in step E50, if the out-of-balance B2 on the blades is to compensate for that of the disk, the large lobes GL1, GL2 must be "larger" than the small lobes PL1, PL2. In this case, one blade will be drawn at random from the set of the first and second small lobes PL1, PL2, observing that the blades in the set of the first and second large lobes GL1, GL2 have a mass smaller than the drawn blade, and choosing one at random that will be permuted with said drawn blade. Moreover, in the case in which the group of the first and second large lobes GL1, GL2 was "made too heavy", the blade that will be drawn in this group should be heavier than the blade drawn in the group of the first and second small lobes PL1, PL2. This can reduce the weight of the large lobes GL1, GL2 and increase the weight of the small lobes PL1, PL2. These steps will progressively obtain an out-of-balance B2 on the blades (or rather the norm of the out-of-balance vector) that will approach that of the bare disk.

In step E52, a blade with mass $M_{PL}$ is drawn at random from the group of the first and second small lobes PL1, PL2.

It will be noted that the permutations are not made completely at random. In order to assure fast convergence, the processor 9 is configured to calculate the out-of-balance B2 on the blades, to know whether the mass of the set of the first and second lobes PL1, PL2 should be increased or reduced.

Thus, step E53 is a test in which the processor 9 is configured to compare the out-of-balance B2 of the blades with the out-of-balance B1 of the bare disk. If the out-of-balance B2 of the blades is less than the out-of-balance B1 of the bare disk, step E54 is performed in which the permutation is made with a blade drawn at random from the group of the first and second large lobes GL1, GL2 of which the mass $M_{GL}$ is larger than the mass of the blade drawn from the group of the first and second small lobes PL1, PL2 (i.e. $M_{GL}>M_{PL}$).

On the other hand, if the out-of-balance B2 of the blades is greater than the out-of-balance B1 of the bare disk, step E55 is performed in which the permutation is made with a blade drawn at random from the set of the first and second large lobes GL1, GL2 of which the mass $M_{GL}$ is less than the mass of the blade drawn from the set of the first and second small lobes PL1, PL2 (i.e. $M_{GL}<M_{PL}$).

Once this permutation has been made, step E56 consists of reapplying steps E14-E31 in FIGS. 4A-4D concerning the placement of blades. Re-application of these steps makes it possible to distribute the masses of the blades in four lobes GL1, GL2, PL1, PL2 in a balanced manner.

Step E51 is then repeated to check if the resultant out-of-balance has dropped below the fixed criterion or if the maximum number of iterations has been reached.

In practice, 90% of disk balancings are done by permutations according to the process in block B41 without going onto blocks B42 and B43. As specified above, the out-of-balance B1 on the bare disk is usually not very large, and the fact of having a practically zero out-of-balance B2 of blades in step E50 (the groups of small and large lobes initially being very balanced) can result in a total out-of-balance less than the fixed criterion of a limited number of iterations.

However, if the maximum number of iterations is reached but the resultant out-of-balance still does not satisfy the fixed criterion, the stochastic permutations block B42 is started.

The stochastic permutation is based on the use of a stochastic (meta-heuristic) optimisation algorithm, that aims at minimising the resultant out-of-balance function (called the energy function), the formula for which is described below.

The stochastic algorithm will progressively and randomly modify the mass vector obtained at the end of the iterative permutation process of block B41, and will only keep modifications that reduce the energy function. The stochastic optimisation algorithm may for example by a Genetic algorithm, a Tabu algorithm, or a Simulated Annealing algorithm.

For example with Simulated Annealing, the stochastic optimisation algorithm consists of a sequence of iterations, each step of which corresponds to a random permutation of a blade in the group of the first and second large lobes GL1, GL2 with the group of the first and second small lobes PL1, PL2. Each step is followed by a recomposition of the placement of the blades in the same way as before according to steps E14-E31 in FIGS. 4A-4D. If the permutation reduces the total out-of-balance, it is systematically validated and the algorithm goes onto the next iteration. If the permutation increases the total out-of-balance, it will be accepted with a certain probability, defined according to a law dependent on a "temperature" parameter that reduces as the inverse of the number of iterations made. This method has the advantage of avoiding local minima.

The iterations continue in this way until the resultant out-of-balance is less than the fixed criterion or the maximum number of iterations is reached.

If the criterion on the resultant out-of-balance is still not respected, the algorithm goes directly to the stochastic permutations block B43 on the shape.

This third and last permutation process is the last recourse in the process in the case in which the total out-of-balance is still not satisfactory. It is more efficient in reducing the out-of-balance, but it does have a repercussion on the shape of the lobes obtained.

In the same way as for block B42, block B43 makes use of a stochastic optimisation algorithm except that the permutation takes place at random between two standard blades (i.e. no hardened lips) in any group.

On the other hand, this algorithm does not include any lobe reconstruction steps. Thus, a permutation can result in a blade being placed at a location that would not respect the monotonic arrangement of the masses. However, in order to limit this phenomenon, a permutation between two blades is allowed when the difference between their masses does not exceed a parameter corresponding to a predetermined mass percentage. As this parameter increases, the deformation of the shape of the lobes will also increase, but the method will converge more quickly.

As for the previous blocks, a maximum number of iterations is defined. If this number is reached, the set of blades will then be deemed to be unbalanceable.

For example, the maximum number of iterations is calculated as follows:

$$\text{steps} = \min\left(A + B * \left\lfloor \frac{(\text{out-of-}balance_{resultant} - coefficient_{heuristic})}{C} \right\rfloor, D\right)$$

Thus, as the resultant out-of-balance becomes increasingly distant from the Heuristic_Coefficient (which correspond to the acceptable total out-of-balance threshold), the maximum number of iterations will be larger. The Heuristic_coefficient can take on values of between about 0.5 cm·g and 5.0 cm·g. The values A, B, C and D are meta-parameters selected so as to optimise the final result and the calculation cost. For example, A=1000, B=50, C=0.1 and D=40000.

Figure 8A:
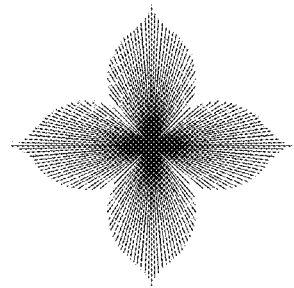
FIGS. 8A and 8B illustrate a distribution of blades according to their masses, and the positioning of blades with hardened lips resulting from tests of the method according to one embodiment of the invention.
Figure 8B:
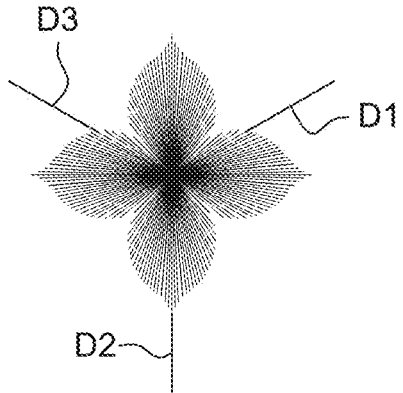

FIGS. 8A and 8B illustrate the distribution of blades as a function of their masses, and the positioning of blades with hardened lips $D_1$-$D_3$ resulting from tests on the method according to one embodiment of the invention made on several real sets of blades.

The resulting out-of-balance obtained is 0.28 cm·g, knowing that the acceptable threshold is 5 cm·g and that the out-of-balance of the bare disk was 258 cm·g. Furthermore, FIG. 5B shows that the angles between the blades with hardened lips $D_1$-$D_3$ are more than 90°.

Figure 9A:
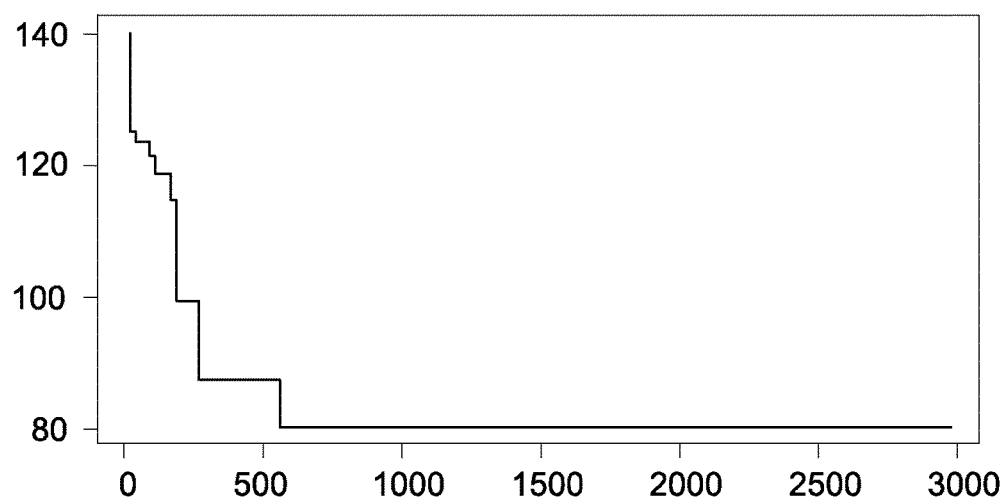
FIGS. 9A-9C show an example illustrating the variation of the resulting out-of-balance as a function of the number of iterations, according to one embodiment of the invention.
Figure 9B:
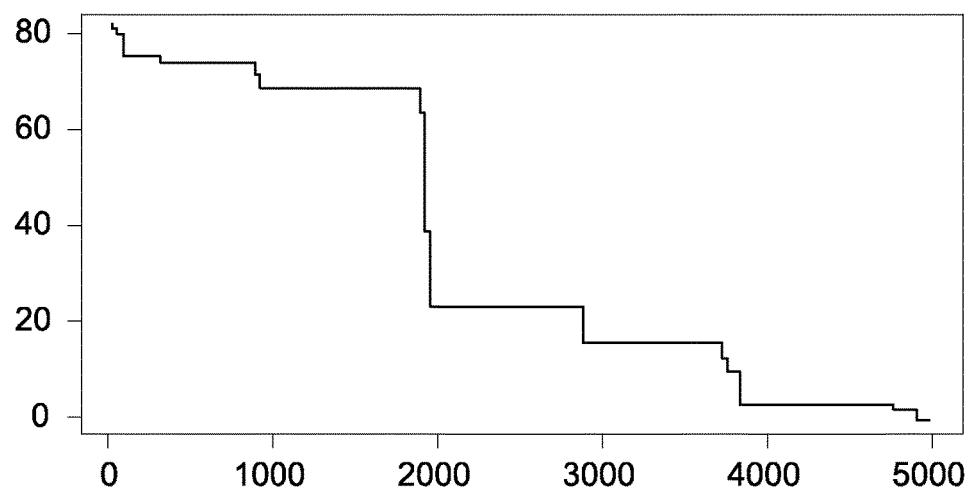
Figure 9C:
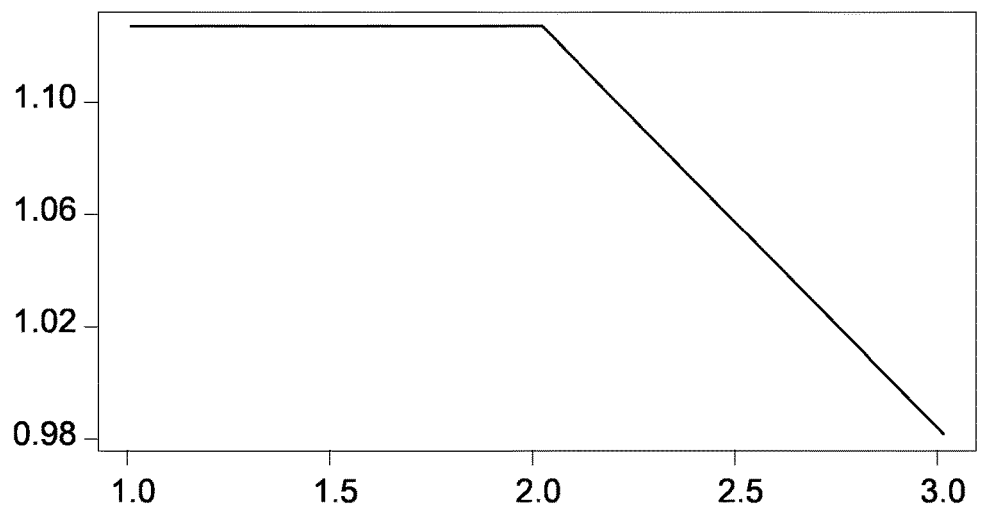

FIGS. 9A-9C illustrate the variation of the resultant out-of-balance as a function of the number of iterations in the case of a set requiring the use of three blocks B41-B43 to satisfy an out-of-balance mass criterion equal to 1 cm·g. It will be noted that the total time is 125 seconds.

More particularly, FIG. 9A relates to block B41 and shows a stagnation around 80 cm·g, hence the need to go onto block B42.

FIG. 9B relates to block B42 and shows a stagnation around 1.5 cm·g, hence the need to go onto block B43.

Finally, FIG. 9C concerning block B43 shows a global out-of-balance very much less than the acceptable threshold.

The invention can increase the life of turbine disks. A consequence of the distribution of blade masses into four lobes is to limit disk deformations. More particularly, a configuration with four lobes makes it possible to keep a spherical shape during rotation, for example unlike a formation with two lobes that would lead to an elliptical deformation of the rotor disk. This shape with four lobes can also limit the difference in mass between adjacent blades. A larger number of lobes or a configuration with no lobes would result in a difficulty in respecting a limitation in differences between adjacent blades.

Moreover, this invention would result in a monotonic distribution of blade masses. It will be noted that when a large mass is placed adjacent to a blade with low mass, the first blade will tend to pull (with centrifugal force) on the bare disk with a larger force than the blade with a lower mass leading to larger deformations in the bare disk. Thus, the monotonic distribution of masses avoids this type of problem.

Furthermore, blades with hardened lips are generally placed to create a groove in the abradable material, so as to limit the air flow in the turbines. This invention makes it possible to have maximum spacing thus guaranteeing effective creation of the groove.

Furthermore, this invention uses stochastic balancing algorithms that are used to obtain all the above results and constraints automatically, efficiently and with very short calculation time.

With this invention, assemblers can thus know how to place the blades on the disk according to their masses, simply, efficiently and very quickly while increasing the life of aircraft engine disks.

What is claimed is:

1. Method for balancing a set of blades (5) that will be arranged on a bare disk (7) of an aircraft engine, the bare disk (7) comprising a determined number of numbered slots ($a_i$) that will hold the same determined number of blades that can have a dispersion of mass, said method being characterised in that it comprises the following steps:

sort the blades (5) by monotonic order of their mass ($m_i$), forming an ordered set of blades, separate the ordered set of blades in a balanced manner into four lobes composed of a first large lobe (GL1), a second large lobe (GL2), a first small lobe (PL1) and a second small lobe (PL2), the blades being sorted in each lobe in a current placement order, arrange the four lobes (GL1, GL2, PL1, PL2) on the bare disk (7) making the current placement order of the blades correspond to the numbered slots of the bare disk, and arranging them in a configuration determined as a function of a first out-of-balance vector (B1) representative of an out-of-balance inherent to the bare disk, and reorganise the blades in the different lobes using an iterative permutation process adapted to balance the first out-of-balance vector by a second out-of-balance vector resulting from the mass dispersion of the blades and their arrangements on the disk, said reorganisation defining a final placement order of the blades on the disk slots.

2. Method according to claim 1, characterised in that separation of the set of blades into four lobes comprises the following steps:

separate the ordered set of blades into first and second groups (GL,PL) approximately balanced in mass in a balanced manner, assigning distinctive blades (a) included in the ordered set of blades to the first and second groups according to a predetermined process, and sharing the other blades in decreasing order of their mass alternating between the first and second groups (GL,PL) while taking account of the number of distinctive blades assigned to each of the first and second groups, and compose the first and second large lobes (GL1, GL2) in a balanced manner starting from said first group (GL) and compose the first and second small lobes (PL1, PL2) in a balanced manner starting from said second group (PL).

3. Method according to claim 2, characterised in that the distinctive blades ($D_i$) are blades with hardened lips that are distributed between the first and second groups (GL, PL) depending on their number while optimising intervals between them, according to the following steps:

if the set of blades comprises three blades with hardened lips, the two heaviest are placed in the first group (GL) while the lightest is placed in the second group (PL), and if the set of blades comprises one or two blades with hardened lips, it is (they are) placed in the first group (GL).

4. Method according to claim 2, characterised in that the composition of the first and second large or small lobes (GL1, GL2; PL1, PL2) within the first or second groups (GP; PL) respectively is determined by distributing the blades on the first, second, third and fourth half-lobes (DG1-DG4; DP1-DP4) of the first or the second group as a function of parity and/or divisibility properties of the number of blades forming the first group (DG) or the second group (DP).

5. Method according to claim 4, characterised in that the number of blades (5) in the first or second group (DG; DP) is an even number that is not divisible by four, the first and second blades are then placed at the vertices of the first and second large or small lobes (DG1, DG2; DP1, DP2) and the remaining blades are distributed in a predetermined manner on the first, second, third and fourth half-lobes (DG1-DG4; DP1-DP4) of the first or second group (DG; DP).

6. Method according to claim 4, characterised in that if the number of blades (5) in the first or second group (DG; DP) is a number that is divisible by four, the blades are distributed equitably in a predetermined manner on the first, second, third and fourth half-lobes (DG1-DG4; DP1-DP4) of the first or second group (DG; DP).

7. Method according to claim 4, characterised in that if the number of blades (5) in the first or second group (DG; DP) is an odd number, the last blade is positioned between the two large or small lobes and if the number of remaining blades is divisible by four, they are distributed in a predetermined manner on the first, second, third and fourth half-lobes (DG1-DG4; DP1-DP4) of the first or second group (DG; DP).

8. Method according to claim 4, characterised in that if the number of blades (5) in the first or second group (DG; DP) is an odd number, the last blade is positioned between the two large or small lobes and if the number of remaining blades is not divisible by four, the first and second blades are placed at the vertices of the first and second large or small lobes and the remaining blades are distributed in a predetermined manner on the first, second, third and fourth half-lobes (DG1-DG4; DP1-DP4) of the first or second group (DG; DP).

9. Method according to claim 5, characterised in that the distribution in a predetermined manner of a number of blades divisible by four on the first, second, third and fourth half-lobes of the first or second group (DG; DP) is made according to periodic sequences of eight steps as follows:

place the first current blade in the first unoccupied position in the second half-lobe (DG2; DP2), place the second current blade in the first unoccupied position in the first half-lobe (DG1 ; DP1), place the third current blade in the first unoccupied position in the fourth half-lobe (DG4; DP4), place the fourth current blade in the first unoccupied position in the third half-lobe (DG3; DP3), and place the next four blades on the half-lobes in the reverse order of the order in the previous steps.

10. Method according to claim 1, characterised in that the determined configuration comprises the arrangement of the first and second small lobes (PL1, PL2) on the bare disk (7) on each side of the first out-of-balance vector (B1).

11. Method according to claim 10, characterised in that said iterative permutation process comprises the following steps:

iterative random permutations of blades between the first group and the second group, if, after the permutations in the previous step, the resulting out-of-balance is greater than a predetermined threshold, stochastic permutations of blades are made between the first group and the second group, if, after the permutations in the previous step, the resulting out-of-balance is greater than said predetermined threshold, stochastic permutations are made directly on the shape between the first group and the second group.

12. Method according to claim 11, characterised in that the iterations are continued in each permutation step as long as the out-of-balance mass is larger than the predetermined threshold and the number of iterations is smaller than a maximum predetermined threshold.

13. System for balancing a set of blades (5) that will be arranged on a bare disk (7) of an aircraft engine, the bare disk (7) comprising a determined number of numbered slots (a) that will hold the same determined number of blades that can have a dispersion of mass, said system being characterised in that it comprises a processor configured to:

sort the blades (5) by monotonic order of their mass ($m_i$), forming an ordered set of blades, separate the ordered set of blades in a balanced manner into four lobes composed of a first large lobe (GL1), a second large lobe (GL2), a first small lobe (PL1) and a second small lobe (PL2), the blades being sorted in each lobe in a current placement order, arrange the four lobes (GL1, GL2, PL1, PL2) on the bare disk (7) such that the current placement order of the blades corresponds to the numbered slots of the bare disk, and arrange the four lobes (GL1, GL2, PL1, PL2) on the bare disk (7) in a configuration determined as a function of a first out-of-balance vector (B1) representative of an out-of-balance inherent to the bare disk, and reorganise the blades in the different lobes using an iterative permutation process adapted to balance the first out-of-balance vector by a second out-of-balance vector resulting from the mass dispersion of the blades and their arrangements on the disk, said reorganisation defining a final placement order of the blades on the disk slots.

\* \* \* \* \*